W. F. DAGGETT.
HUB FOR LOOSE PULLEYS, CLUTCHES, HANGER BEARINGS, AND THE LIKE.
APPLICATION FILED DEC. 18, 1919.
1,429,065.
Patented Sept. 12, 1922.
2 SHEETS—SHEET 1.
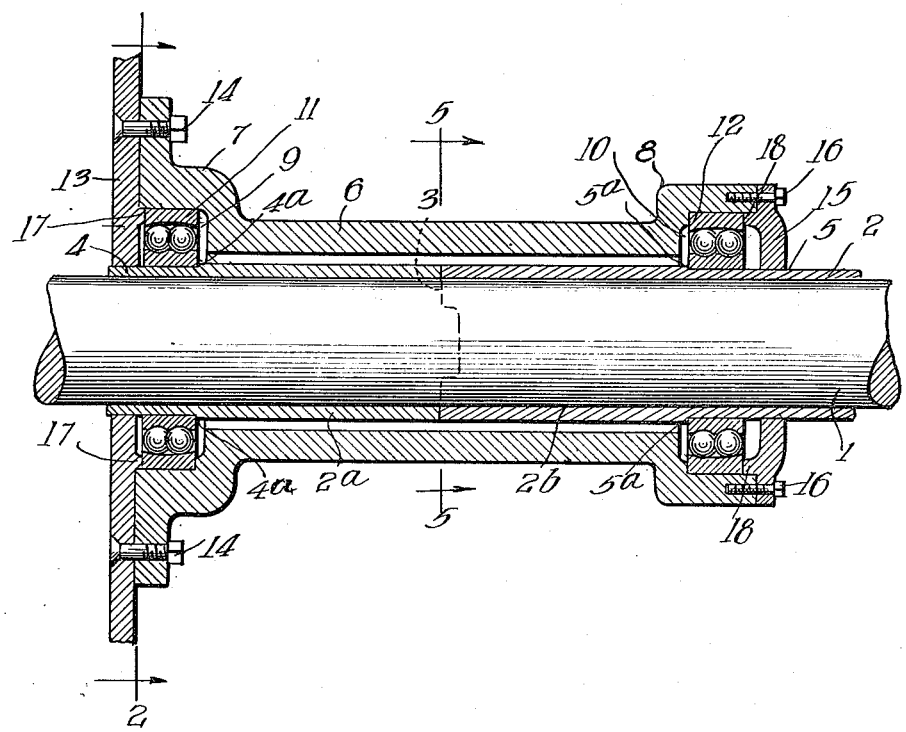
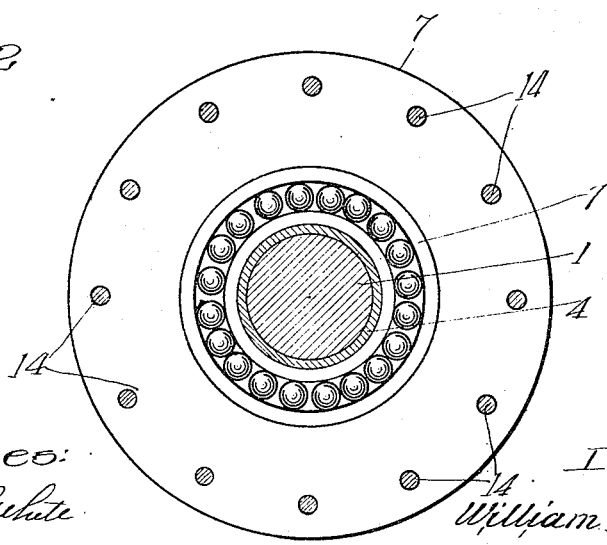
Witnesses:
Harry R. White
N. P. Kilroy
Inventor:
William F. Daggett.
By A. Miner Belfield Atty.

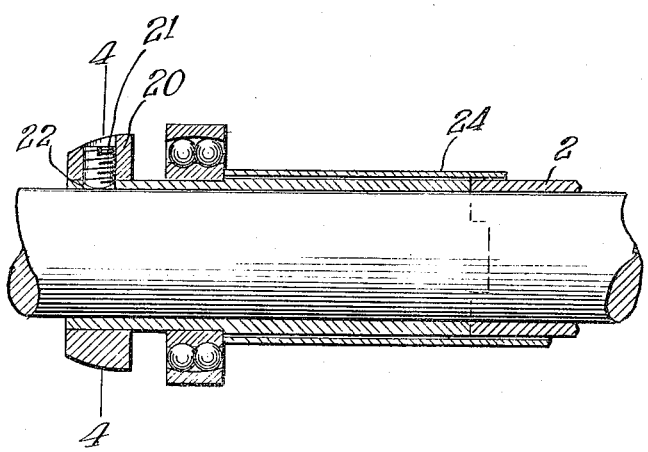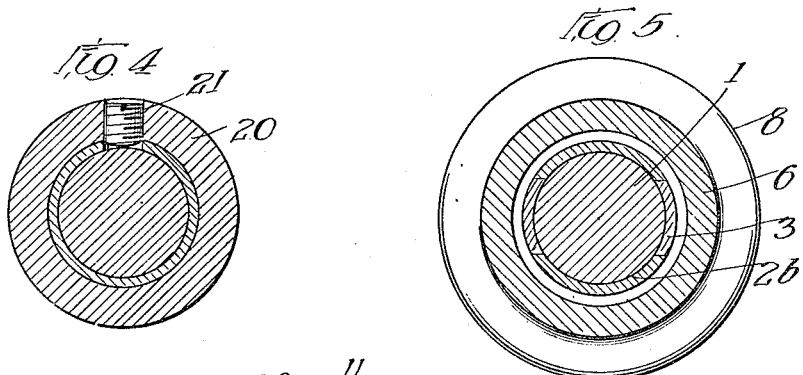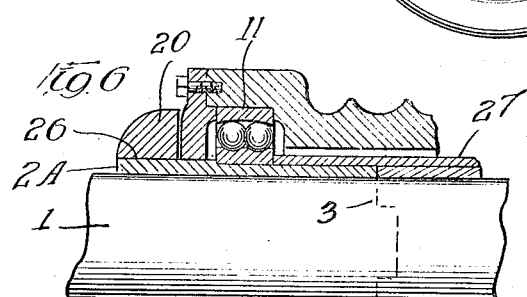

Patented Sept. 12, 1922.

1,429,065

UNITED STATES PATENT OFFICE.

WILLIAM F. DAGGETT, OF CHICAGO, ILLINOIS.

HUB FOR LOOSE PULLEYS, CLUTCHES, HANGER BEARINGS, AND THE LIKE.

Application filed December 18, 1919. Serial No. 345,803.

*To all whom it may concern:*

Be it known that I, WILLIAM F. DAGGETT, a citizen of the United States, residing at Chicago, in the county of Cook and State of Illinois, have invented a certain new and useful Improvement in Hubs for Loose Pulleys, Clutches, Hanger Bearings, and the like, of which the following is a full, clear, concise, and exact description, reference being had to the accompanying drawings, forming a part of this specification.

My invention relates to hubs for loose pulleys, clutches, hanger bearings and the like.

One of the objects of the invention is to provide a simple and practical device of the class specified.

Another object of the invention is to arrange for easy and quick application of the device to the shaft carrying it, and removal of the same from such shaft.

Another object of the invention is to secure the foregoing and other desirable results in a simple and expeditious manner.

In the accompanying drawings, Fig. 1 is a longitudinal section of a hub of the class specified embodying my invention;

Fig. 2 is a cross section on line 2—2 in Fig. 1;

Fig. 3 is a longitudinal section of a portion of a modified form.

Figs. 4 and 5 are cross sections taken on lines 4—4 and 5—5 in Figs. 3 and 1, respectively; and Fig. 6 is a longitudinal section of a portion of a modified form of hub construction.

Referring to Figs. 1 and 2, I show a shaft 1 which is to support the clutch, pulley or hanger bearing of which the hub is to be a part. Surrounding the shaft 1 and fitting closely upon the same is a sleeve 2. This sleeve 2 is transversely split or divided, so that it consists of two separable parts or halves $2^a$ and $2^b$. Preferably these separable parts or halves are interlocked so as to prevent relative rotation, one practical arrangement of which is to join the separable halves by irregular or interlocking end portions, as shown by the line 3, which marks the joining line of said parts $2^a$ and $2^b$. The outer ends of said parts $2^a$ and $2^b$ are reduced, as at 4 and 5.

A sleeve 6 is arranged over the sleeve 2, its ends being enlarged at 7 and 8. These enlarged ends are provided with recesses or chambers 9 and 10, in which are located ball bearings 11 and 12 respectively. These ball bearings are mounted on the reduced end portions 4 and 5 of the sleeve 2. The recess 9 is closed by a member 13, which is bolted by bolts 14 to the enlarged end 7 of sleeve 6. This member 13 forms part of a clutch to which the device is understood to be applied in the present instance. The recess 10 is closed by a member 15 which is bolted to the enlarged end 8 by bolts 16. The member 13 is provided with an annular projection 17 to engage the ball bearing 11 and hold same against shoulder on sleeve 2, and the member 15 is provided with an annular projection 18 to engage bearing 12 and hold same against shoulder $5^a$ on sleeve 2.

The device is assembled as shown, the two parts of the sleeve 2 being preferably slipped upon the shaft 1 on opposite sides of the sleeve 6, and moved toward one another and interlocked.

When desired to change or repair either ball bearing, the separable portion of the sleeve 2 carrying such bearing may be removed with such bearing, leaving the rest of the device intact. Otherwise much difficulty might be experienced in taking the device apart.

In the modification shown in Figs. 3 to 5 a collar 20 is secured in position by screw 21 which passes through sleeve extension 22 and engages shaft 1. This locks sleeve 2 to the shaft. This device is intended for use as part of a pulley. This arrangement also has a supplemental or outer sleeve 24, enclosing the portion of the sleeve 2 between the ball bearings 11, thereby assisting in holding the latter in place and also covering the joint between the divisions or parts of said sleeve 2.

In the arrangement shown in Fig. 6 a sleeve $2^A$ is shown on the shaft 1, and this sleeve is also transversely divided along the line 3. This sleeve $2^A$ is shown with its end portions 26 enlarged instead of reduced as in the arrangement of the preceding figures. The collar 20 with a set nut 21 is also shown as is also a surrounding sleeve 27. The latter is similar to the sleeve 24 but by preference fits closely on the sleeve 2ᴬ. By this arrangement the ball bearings 11 may be slipped upon the sleeve 2ᴬ, or rather the parts thereof, from the inner or middle end portions of said sleeve 2ᴬ, and may then be moved or slipped toward the enlarged ends 26 until they abut against the shoulders formed by said enlarged portions 26. The sleeve 27 may be put in place after the ball bearings 11 are slipped over the divisions or parts of the sleeve 2ᴬ, and thus the ball bearings may be locked between the shoulders formed by said enlarged end portions 26 and said sleeve 27. This forms a very secure locking arrangement for holding the ball bearings in place and also an arrangement by which those ball bearings may be very readily and quickly adjusted in position and removed and replaced for repairs or otherwise.

It will be understood that changes and modifications may be made without departing from the spirit of the invention.

What I claim is:

1. A device of the class specified having a central space or chamber, ball bearings at the ends of said space or chamber, a transversely split sleeve in said space or chamber to permit individual removal of the sleeve sections and ball bearings, said ball bearings being mounted as complete units upon said sleeve sections and interposed between the same and the inner walls of said space or chamber, and means for closing the ends of said space or chamber, said sleeve passing through said closing means.

2. A device of the class specified having a central space or chamber, ball bearings at the ends of said space or chamber, a transversely divided sleeve in said space or chamber, said ball bearings being mounted as complete units upon the individual sections of said sleeve and interposed between the same and the inner walls of said space or chamber, and means for closing the ends of said space or chamber, said sleeve passing through said closing means and being provided with reduced portions upon which said ball bearings are fitted.

3. A device of the class specified having a central space or chamber, ball bearings at the ends of said space or chamber, a transversely divided sleeve in said space or chamber, said ball bearings being mounted as complete units upon said sleeve and interposed between the same and the inner walls of said space or chamber and said bearings being removable as complete units from the respective sleeve sections, and means for closing the ends of said space or chamber, said sleeve passing through said closing means and said closing means being provided with surfaces adapted to engage said ball bearings and hold them in position on said sleeve.

4. A device of the class specified having a central space or chamber, ball bearings at the ends of said space or chamber, a transversely divided sleeve in said space or chamber, said ball bearings being mounted as complete units upon the sections of said sleeve and interposed between the same and the inner walls of said space or chamber, and means for closing the ends of said space or chamber, said sleeve passing through said closing means and said closing means being provided with surfaces adapted to engage said ball bearings and hold them in position on said sleeve and in contact with the shoulders provided by reduced ends of said sleeve.

5. A device of the class specified having a centrally disposed aperture or chamber, ball bearings in said aperture or chamber at the ends thereof, a transversely divided sleeve also in said space or chamber, said ball bearings being separable from but rigidly mounted as complete units upon the remote ends of said sleeve and being interposed between the same and the inner wall of said aperture or chamber, and closing members in the form of discs fitted against the sides of that portion of the device in which said central aperture or chamber is formed, and means for detachably holding said members in position.

6. A device of the class specified having a centrally disposed aperture or chamber, ball bearings in said aperture or chamber at the ends thereof, a transversely divided sleeve also in said space or chamber, said ball bearings being separable from but rigidly mounted as complete units upon the ends of said sleeve and being interposed between the same and the inner wall of said aperture or chamber, and closing members in the form of discs fitted against the sides of that portion of the device in which said central aperture or chamber is formed, and means for detachably holding said members in position, said members being provided with shoulders adapted to fit against the inner walls of said aperture or chamber.

7. A device of the class specified having a hub provided with a central bore or chamber, ball bearings arranged in said bore or chamber, a transversely divided sleeve on the individual sections of which said ball bearings are mounted as complete units and removable as such, said ball bearings being interposed between said sleeve and the inner wall of said bore or chamber, and closing members detachably secured to said hub, and serving to hold said ball bearings in position in said space or chamber, and said sleeve having the end portions of its sections on which said ball bearings are mounted reduced in size so as to form shoulders against which said ball bearings lie.

8. A device of the class specified comprising a transversely divided sleeve having means whereby the parts of said sleeve may be interlocked with each other, ball bearings mounted as complete units on the parts of said sleeve and a hub structure enclosing said sleeve, and a second sleeve interposed between said transversely divided sleeve and said hub structure and spacing said bearings.

9. A device of the class specified comprising a transversely divided sleeve, ball bearings mounted as complete units thereon and a hub enclosing said sleeve and cooperating with said bearings, means for closing the ends of said hub, and a second sleeve interposed between said transversely divided sleeve and said hub and serving to space said bearings.

10. In a loose pulley, the combination of a shaft, sleeve sections mounted on the shaft and having an interlocking engagement, a hub, concentric ball bearing runways interposed between the hub and the sleeve sections and flanges on the hub bearing exteriorly against the outer runways.

11. In a ball bearing pulley, the combination of a shaft, sleeve sections mounted upon the shaft, interlocking heads on the sleeves furnishing shoulders, concentric ball runways in contact with the respective shoulders, a hub enclosing the runways and provided with flanges bearing exteriorly against the outer runways, and a pulley carried by the hub.

12. In a loose pulley, the combination of a shaft, sleeve sections mounted on the shaft and having an interlocking engagement, a hub, and ball bearing elements interposed between the hub and the sleeve sections, one of the sleeves being provided with a split extension, and a clamping collar carried by the extension for clamping the sleeve to the shaft.

13. In a ball bearing pulley, the combination of a shaft, sleeve sections mounted upon the shaft, interlocking heads on the sleeves furnishing shoulders, concentric ball runways in contact with the respective shoulders, a hub inclosing the runways provided with flanges bearing against the outer runways, and a pulley carried by the hub, one of the sleeves being provided with a clamping collar carried by the extension for clamping the sleeves to the shaft.

14. In a loose pulley, the combination of a shaft, sleeve sections mounted on the shaft and having an interlocking engagement adapted to prevent relative rotation, said sleeve sections being each provided with an exteriorly facing abutment, an inner ball runway for each section bearing on its inner edge against the adjacent abutment, an outer ball runway concentrically held in spaced relation with respect to the coacting inner runway, balls interposed between the runways composing a pair, and a hub encircling the runways and provided at each end with an inwardly extending peripheral flange bearing against the outer edge of the contiguous outer runway.

15. In combination, a rotary shaft, a divided sleeve on said shaft, a hub surrounding said divided sleeve and provided with end chambers, the sections of said divided sleeve having reduced portions, ball bearings comprising inner and outer races mounted as complete units on the reduced portions of said sleeve sections and lying in said chambers, said bearings being removable as units from the sections, and retaining means on said solid sleeve for retaining said bearings.

16. In combination, a rotary shaft, a divided sleeve on said shaft, a hub surrounding said divided sleeve and provided with end chambers, said chambers having internal shoulders, annular shoulders on the sections of said divided sleeve, unit ball bearings comprising each, inner and outer races arranged between said sleeve sections and chambers and removable as units therefrom, and retaining plates on said hub maintaining said races in abutment with said shoulders.

17. In combination, a rotary shaft, a divided sleeve on said shaft, a hub surrounding said divided sleeve and provided with end chambers, said chambers having internal shoulders, external shoulders on the free ends of the sections of said divided sleeve, unit ball bearings comprising each, inner and outer races mounted between said sleeve sections and chambers and removable as units therefrom, and retaining plates on said hub, said plates having annular shoulders abutting said outer races for retention of the bearing and sleeve sections in position.

18. In combination, a rotary shaft, a divided sleeve on said shaft, a hub surrounding said divided sleeve and provided with end chambers, said chambers having internal shoulders, external shoulders on the free ends of the sections of said divided sleeve, unit ball bearings comprising each, inner and outer races secured between said sleeve sections and chambers and removable as units therefrom, and retaining plates on said hub, said plates having annular shoulders abutting said outer races, one of the sections of said divided sleeve extending through one of said plates, and means securing said section fixedly to the shaft.

19. In combination, a rotatable member, a hub surrounding but spaced from said member, a sleeve within said hub and snugly embracing said rotatable member, said sleeve comprising two sections interlocked, portions of which are reduced to form shoulders, said hub having annular chambers at its ends, unit ball bearings in said chambers having inner and outer races, the inner races fixedly secured to the reduced portions of said sleeve, and abutting said shoulders, the outer races seating in said chambers, said bearings being removable as individual units and removable members on the ends of said hub abutting and retaining said bearings.

In witness whereof, I hereunto subscribe my name this 8th day of December, A. D. 1919.

WILLIAM F. DAGGETT.